Figure 1:
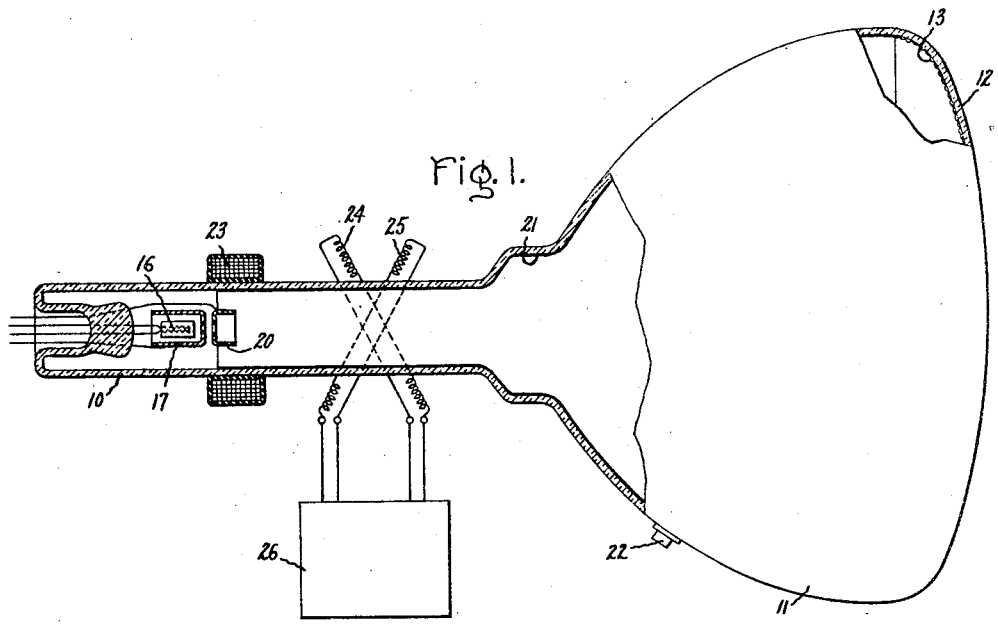

July 15, 1947.   G. R. FONDA   2,423,830
CATHODE RAY SCREEN HAVING CONTRASTING COLORS
AND UNLIKE RATES OF DECAY OF LUMINESCENCE
Filed March 25, 1943

FAST AND SLOW
PHOSPHORS OF
CONTRASTING COLOR

FAST AND SLOW
PHOSPHORS OF
CONTRASTING COLOR

Inventor
Gorton R. Fonda,
by Harry E. Dunham
His Attorney.

Patented July 15, 1947

2,423,830

UNITED STATES PATENT OFFICE 2,423,830

CATHODE-RAY SCREEN HAVING CONTRASTING COLORS AND UNLIKE RATES OF DECAY OF LUMINESCENCE

Gorton R. Fonda, Schenectady, N. Y., assignor to General Electric Company, a corporation of New York Application March 25, 1943, Serial No. 480,505

8 Claims. (Cl. 250—164)

The present invention relates to luminescent screens in cathode ray tubes and is of especial utility in providing means for improving such tubes for use in range-finding and direction-finding equipments.

One class of range- and direction-finding equipments functions by transmitting electromagnetic radiation in the directions to be investigated and then determining the direction and time of return of these radiations upon reflection from objects which may intercept the radiations. A cathode ray tube may be used in such equipment for providing the required information concerning the reflected radiation. The cathode ray tube is associated in such way with suitable apparatus for controlling the beam of cathode rays (electrons) in response to these reflected radiations that the electron beam produces on a suitable screen a visible image or trace having a form determined by the radiations. My copending application, Serial No. 514,815, filed December 18, 1943, deals with cathode ray screens comprising luminescent phosphors in multilayers more generically than the present application. In a screen of said application Ser. No. 514,815, a phosphor layer exposed to cathode rays is thereby rendered radiation-emitting and the successive layers are so chosen that the radiation emission of one layer in turn produces excitation of a next adjacent layer. The viewed layer nearest the glass support of a screen covered by said application consists of a phosphor which produces, when excited by radiation emitted by a superimposed phosphor layer, visible luminescence persisting for a relatively long period compared with its persistence of luminescence in response to direct cathode ray excitation.

In order to facilitate the interpretation of the information thus provided and in order to indicate a change in the location of the object producing the trace, it is desirable not only that such trace should persist long enough to be noted by an observer, but it is also desirable that a trace produced on the screen by a movable object should contrast with a trace produced by a stationary object. It is also desirable that a trace denoting a moving object should indicate on the screen the direction of motion of the object.

In accordance with my present invention I have provided a cathode ray screen in which by contrasting trace coloration such desired information is given. The trace produced by a movable object in an apparatus embodying my invention has a different color from a trace produced by a stationary object; also a trace produced by a moving object will have different color as well as a different intensity at or near its origin than at its terminus where the latest position of the moving object is indicated. The desired color contrasts are produced by the presence in a luminescent screen of phosphors which are characterized by having unlike rates of pick-up in response to excitation by ultraviolet or other agency and being phosphorescent when the exciting agency ceases, the phosphorescent luminosity having unlike rates of decay, as will be explained, and emitting light of contrasting colors. Accordingly the combined light emitted by said phosphors varies in color during the period of decay of luminescence, the change being observable by the human eye.

Figure 2:
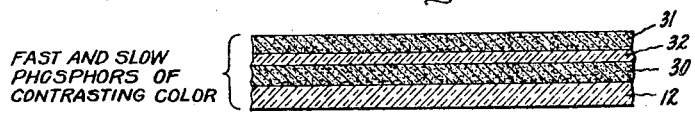
Figure 3:
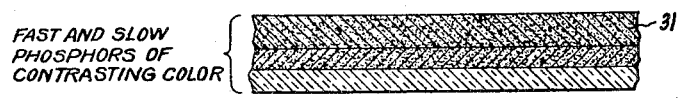

The features of invention desired to be protected herein are pointed out with greater particularity in the appended claims. A more complete understanding of my invention may be had from the following description taken in connection with the accompanying drawing. Fig. 1 of the drawing is a sectional view of a cathode ray tube as illustrative of a device embodying my invention; and Figs. 2 and 3 are enlarged sectional views conventionally illustrating screens embodying my invention.

Referring particularly to Fig. 1 there is shown schematically a cathode ray tube comprising a glass envelope which has a relatively slender stem portion 10 and an enlarged bulbous portion 11. The latter portion is provided with a window 12 through which an observer may view a luminescent screen applied to the inner surface of the window as indicated at 13. The nature of the screen will be explained in detail at a later point.

At the end of the envelope remote from the screen 13 there is provided an arrangement for generating a cathode ray beam (i. e. a concentrated stream of electrons). The means employed for this purpose may comprise any conventional type of electron gun and in the present instance is illustrated diagrammatically as comprising an electrically heated cathode 16 which is enclosed within a control or focusing cylinder 17. Adjacent the extremity of the cylinder 17 there is provided an apertured electrode or grid 20 which is adapted to be maintained at a positive potential with reference to the cylinder and which has the function of initially accelerating the electrons developed by the cathode 16 toward the screen 13. Final acceleration of the electrons is provided by a high voltage anode consisting of a layer of colloidally suspended graphite or other appropriate conductive material deposited on the inner lateral wall surface of the tube envelope as indicated at 21. A terminal connection for this conductive layer is provided by a lead-in conductor arrangement shown at 22.

Outside the discharge envelope and between the electrode 20 and the screen 13 there is provided a magnetic focusing coil 23. In addition, there are two sets of deflecting coils respectively indicated at 24 and 25. These are adapted to produce mutually perpendicular deflections of the beam in such fashion as to cause it to move over the surface of the screen 13.

The nature of the deflection which is thus obtained is controlled by connecting the terminals of the coils 24 and 25 to a suitable controlling apparatus which is diagrammatically represented here by a rectangular block 26. Such apparatus for present purposes may be assumed to comprise the elements of a range- and direction-finding equipment. Depending upon the nature of the potentials impressed upon the deflecting coils 24 and 25 by the equipment 26, the cathode ray beam may be caused to develop varying traces upon the luminescent screen 13, which traces may be interpreted by an informed observer in terms of the factors desired to be ascertained by the use of the equipment.

The duplex fluorescent screen 13, as shown in the enlarged cross-sectional view thereof, Fig. 2, comprises separate and distinct layers 30 and 31 of two different luminescent materials separated whenever necessary by an intermediate layer 32 of a material which is impervious, or substantially impervious, to electrons. The two layers 30 and 31 as well as the intermediate layer 32 are so selected that when the phosphor of the inner layer 31 is excited by the cathode ray beam it will emit light rays capable of penetrating layer 32 and exciting the phosphor mixture comprising the outer or viewed layer 30 in such a manner that the last mentioned phosphor emits a visible luminescence which persists for an appreciable time after excitation. In an alternate arrangement, shown in Fig. 3, the phosphor layer 31 may be made sufficiently thick and dense to intercept all electrons so that a separate electron-shielding layer is rendered unnecessary.

In the embodiment diagrammatically indicated in Fig. 2, the three layers 30, 32 and 31 are deposited in any suitable way upon a foundation consisting of the glass layer 12 of the cathode ray tube. The layer 32, which is impervious to electrons but is pervious to ultraviolet and visible rays at the end of the spectrum adjacent the ultraviolet, may consist of an alkali silicate, such as water glass.

The layer 30 which is adjacent the glass may consist of a mixture of phosphors in suitable proportions characterized by differences in the speeds of pick-up and decay of luminescence, as will be described.

The layer 31 which is exposed to the electron beam, or in other words faces the cathode in the interior of the cathode ray tube, may consist of a material such as zinc sulfide activated with silver which emits ultraviolet and bluish light adjacent the ultraviolet when excited by cathode rays (that is, by electron bombardment). The layer 30 may comprise various combinations of phosphors having the desired contrasting characteristics. For example, this layer 30 may consist of a mixture of copper-activated zinc-cadmium sulfide, including by weight about 25 to 40 per cent of cadmium sulfide, which emits red phosphorescent light and copper-activated zinc sulfide which emits green phosphorescent light.

One method of applying a coating of phosphors on glass which has been found to be suitable employs an alkali silicate, such as a soluble potassium silicate, both as a binder for the respective phosphors and as an electron-impervious layer, if such a layer is found to be desirable. A very thin film of a dilute water solution of the silicate, for example a 7 per cent solution, is deposited in the form of a very fine spray upon the clear inner face of the window in an amount sufficient to wet the glass. The mixed phosphors are immediately dusted upon the wet film, the above steps repeated if necessary to obtain a phosphor layer of desired thickness. If an electron-shielding layer is required, as shown at 32, Fig. 2, then an additional coating of the same material is sprayed on top of the phosphor layer. It may be desirable to apply successive coatings, each of which is dried before the next layer is deposited. The tube then is baked, for example, at 200° C. for 20 minutes to harden the binder. After the tube has cooled, the phosphor layer 31 is applied over the electron-impervious layer 32 employing the same procedure and binder as above described. In some cases it may be desirable to apply a small amount of the silicate binder over the second deposited phosphor layer 31, but as such a coating may prevent an appreciable percentage of electrons from reaching the layer, thus resulting in a decrease of efficiency, such external layer or binder must be exceedingly thin. Finally, the cathode ray tube is baked at about 200 to 350° C., preferably when filled with nitrogen, for a time sufficiently long to set the silicate and to de-gas the carbon deposited at 21.

A phosphor of copper-activated zinc-cadmium sulfide (comprising for example 30 per cent cadmium sulfide by weight) responds to an exciting agency such as ultraviolet much more quickly than copper-activated zinc sulfide phosphor, that is, the time duration of excitation required for the red phosphorescent zinc-cadmium phosphor to reach normal luminous intensity is materially shorter than the time required for the green phosphorescent zinc phosphor to reach normal luminescence. I shall refer to this characteristic as the rate of pick-up. The green-emitting zinc sulfide phosphor has a slower pick-up so that a longer duration of excitation is required before it can attain its normal emission intensity. Consequently, when these two phosphors are associated with one another, as in layer 30, a short series of reflected radiation pulses will excite the red phosphor strongly and the green only weakly so that the light signal appearing as a trace on the screen will be predominantly red. This is the condition under which a moving object is recorded, so that its presence will be made obvious to observation by the human eye by the appearance of a red trace.

When, on the other hand, reflected radiation is received from a stationary object, there will be a continuous succession of pulses emanating from the same direction and the signal will be recorded on the screen by a similar continuous succession of cathode ray pulses falling repeatedly upon a single spot on the screen. This condition is favorable to the excitation of the slow-responding green phosphor to full, normal emission. The light emitted by the resulting trace will therefore be a composite of that emitted by the individual red and green phosphors in layer 30 and, when their properties are properly chosen, will appear greenish by contrast with the reddish trace resulting from the short pulse, such as would be received from a moving object.

This effect of color contrast in the images of stationary or relatively stationary and moving objects is enhanced by the relatively long stage of decay or persistence of luminescence of the described green phosphorescent zinc sulfide phosphor. In the case of a moving object, for instance, whose changes in position are recorded by a succession of different traces, the last and most recent of these traces will be red and the older ones will be weaker and tinged with green to an extent depending upon their age.

Various other combinations of slow and fast pick-up (also slow and fast decay) phosphors may be made within the scope of my invention. For example, a yellow-phosphorescent copper-activated zinc-cadmium sulfide can be used in combination with the red-phosphorescent material having a faster rate of pick-up. A zinc-cadmium sulfide containing about 12 per cent of cadmium sulfide phosphoresces yellow and possesses a sufficiently slow pick-up and slow decay characteristic.

Similarly, strontium sulfide activated with bismuth phosphoresces to emit bluish-green light with a slow pick-up and slow phosphorescent decay. When mixed with the red-emitting high cadmium sulfide, copper-activated phosphor, then a trace or image from a stationary object will emit light which is predominantly bluish-green.

In another modification of my invention the layer 31 (Figs. 2 and 3) which is exposed to the electron beam comprises a mixture of at least two phosphors, one being ultraviolet-emitting when exposed to electron bombardment, and the other emitting light in the visible range. The latter phosphor should have a rapid pick-up and a short but appreciable phosphorescence when exposed to electron bombardment. The layer 30 adjacent the glass foundation may consist of a slow pick-up, long phosphorescent phosphor, such as yellow-emitting zinc cadmium sulfide low in cadmium content, or bluish-green emitting strontium sulfide, whose phosphorescence is of contrasting color to the phosphorescence of the light-emitting phosphor used in layer 31.

The layer 31 may consist, for example, of a mixture of zinc sulfide activated with silver mixed with a phosphor phosphorescing with a contrasting coloration, as, for example, cadmium silicate activated with manganese and arsenic. Such a phosphor is described in Froelich Patent 2,206,280, patented July 2, 1940.

In place of the silver-activated zinc sulfide, I may employ any other phosphor which emits in the near ultra-violet, such as bismuth-activated zinc silicate.

What I claim as new and desire to secure by Letters Patent of the United States is:

1. A cathode ray screen comprising the combination of phosphors which are capable when excited of emitting visible light of contrasting colors and which are characterized by having unlike rates of decay of luminescence, said rates of luminescent decay differing by such amount that the combined color of the visible light emitted by said phosphors varies sufficiently to be observable by the human eye as the luminescence decays.

2. A cathode ray screen comprising the combination of a phosphor capable of generating ultraviolet when exposed to electron impact, and a plurality of phosphors which are respectively capable of emitting visible light of contrasting colors when exposed to ultraviolet, said phosphors also being characterized by having unlike rates of pick-up and decay of luminescence, the rates of luminescent decay differing by such amount that the combined color of the visible light emitted by said phosphors varies with the decay of luminescence sufficiently to be observable by the human eye.

3. A cathode ray screen comprising the combination of a layer of luminescent material capable of emitting ultraviolet when subjected to electron impact, and a second layer of luminescent material shielded from electron impact, said second layer consisting of a mixture of phosphors both emitting light of different colors when exposed to ultraviolet from the first layer and having unlike rates of decay of luminescence, said rates of luminescent decay differing by such amount that the combined color of the visible light emitted by said phosphors varies with the decay of luminescence sufficiently to be observable by the human eye.

4. A cathode ray apparatus comprising a support, a layer of phosphor thereon comprising both copper-activated zinc-cadmium sulfide which contains a mixture of about 25 to 40 per cent of cadmium sulfide and a complementary proportion of copper-activated zinc sulfide, a second superimposed layer of silver-activated zinc sulfide and means for subjecting said latter layer to electron bombardment.

5. A cathode ray apparatus comprising an envelope providing a viewing screen, means for subjecting said screen to a beam of cathode rays, a layer of luminescent material thereon, which is exposed to direct impact of said rays comprising a phosphor which will emit ultraviolet, said first layer including also a second phosphor which will emit colored visible light radiation under the influence of cathode rays, and a second layer of luminescent material which is shielded from cathode rays but is exposed to ultraviolet from said first layer and will emit visible light having a color unlike the color of said first layer, said phosphors of contrasting colors having unlike rates of pick-up and decay of luminescence, the rates of decay of luminescence of said phosphors emitting colored light differing by such amount that the combined color of the visible light emitted by said phosphors varies with the decay of luminescence sufficiently to be observable by the human eye.

6. A cathode ray screen comprising the combination of a layer of luminescent material which is capable of emitting ultraviolet when subjected to electron impact and a second layer of luminescent material which is shielded from electron impact, said second layer comprising a mixture of strontium sulfide activated with bismuth having a slow pick-up and slow phosphorescent decay and copper-activated zinc-cadmium sulfide containing sufficient cadmium to emit red light with a fast pick-up and fast phosphorescent decay, the rates of decay of the phosphors of said second layer differing by such amount that the combined color of the visible light emitted by said phosphors varies with the decay of luminescence sufficiently to be observable by the human eye.

7. A cathode ray tube comprising the combination of a luminescent screen constituted by copper-activated zinc-cadmium sulfide and copper-activated zinc sulfide, a phosphor superimposed thereon which is capable of generating ultraviolet when exposed to electron impact and electromagnetically controlled means for subjecting said superimposed phosphor to electron bombardment whereby luminous images of contrasting color are produced in said screen.

8. A cathode ray apparatus comprising an envelope providing a viewing screen, means for subjecting said screen to a beam of cathode rays, a layer of luminescent material thereon, which is exposed to direct impact of said rays comprising two phosphors, one of which will emit ultraviolet, and the second of which will emit colored visible light and consists of cadmium silicate activated with manganese and arsenic and a second layer which is shielded from cathode rays and will emit visible light having a color unlike the color of said first layer, said phosphors of contrasting colors having unlike rates of pick-up and decay of luminescence, the rays of decay of luminescence of said phosphors emitting colored light differing by such amount that the combined color of the visible light emitted by said phosphors varies with the decay of luminescence sufficiently to be observable by the human eye.

GORTON R. FONDA.

REFERENCES CITED

The following references are of record in the file of this patent:

UNITED STATES PATENTS

| Number | Name | Date |
|---|---|---|
| 1,096,644 | Saubermann | May 12, 1914 |
| 2,150,966 | Eggert et al. | Mar. 21, 1939 |
| 2,177,691 | Dawihl et al. | Oct. 31, 1939 |
| 2,233,786 | Law | Mar. 4, 1941 |
| 2,243,828 | Leverenz | May 27, 1941 |
| 2,277,009 | Ardenne | Mar. 17, 1942 |
| 2,303,563 | Law | Dec. 1, 1942 |

FOREIGN PATENTS

| Number | Country | Date |
|---|---|---|
| 406,957 | Great Britain | Nov. 8, 1933 |
| 424,195 | Great Britain | June 8, 1934 |
| 440,818 | Great Britain | Dec. 21, 1934 |
| 468,238 | Great Britain | Jan. 3, 1936 |
| 513,518 | Great Britain | Dec. 21, 1938 |
| 640,056 | Germany | Dec. 21, 1936 |
| 453,927 | Great Britain | Dec. 12, 1934 |

OTHER REFERENCES

Leverenz, "Cathodoluminescence as Applied in Television," R. C. A. Review, vol. V, No. 2, Oct. 1940. Page 132. 250–164.